(12) United States Patent 
Schulz

(10) Patent No.: US 12,568,084 B2 
(45) Date of Patent: Mar. 3, 2026

(54) METHOD FOR DEVICE COMMISSIONING IN A NETWORK SYSTEM AND NETWORK SYSTEM

(71) Applicant: ABB Schweiz AG, Baden (CH)

(72) Inventor: Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 118 days.

(21) Appl. No.: 18/672,609

(22) Filed: May 23, 2024

(65) Prior Publication Data

US 2024/0314126 A1 Sep. 19, 2024

Related U.S. Application Data

(63) Continuation of application No. PCT/EP2022/082787, filed on Nov. 22, 2022.

(30) Foreign Application Priority Data

Nov. 26, 2021 (EP) ..................................... 21210845

(51) Int. Cl.
   *H04L 9/40* (2022.01)
   *H04L 41/0816* (2022.01)
(52) U.S. Cl.
   CPC ...... *H04L 63/0876* (2013.01); *H04L 41/0816* (2013.01)
(58) Field of Classification Search
   CPC ........... H04L 63/0876; H04L 41/0816; H04W 12/08; H04W 12/06
   See application file for complete search history.

(56) References Cited

U.S. PATENT DOCUMENTS

| | | | | |
|---|---|---|---|---|
| 7,464,858 | B2 * | 12/2008 | Crawford | ................. G07C 9/22 235/382 |
| 2007/0053513 | A1 * | 3/2007 | Hoffberg | .............. G06V 40/103 380/201 |
| 2011/0087891 | A1 * | 4/2011 | Fries | ........................ G07C 9/21 713/185 |

FOREIGN PATENT DOCUMENTS

| | | |
|---|---|---|
| EP | 3668043 A1 | 6/2020 |
| WO | WO 2005/015875 A1 | 2/2005 |

OTHER PUBLICATIONS

Microsoft, "Zero Trust Model," downloaded from the Internet on May 21, 2024, at https://www.microsoft.com/en-us/security/business/zero-trust, 14 pp. (2024).

(Continued)

*Primary Examiner* — Sm A Rahman 
(74) *Attorney, Agent, or Firm* — Fitch Even Tabin & Flannery LLP

(57) ABSTRACT

A network system with a network core unit, a network-managing unit, a device-managing unit, and a network data-infrastructure, and a method for admitting an application device in this network system, are disclosed. The method includes authenticating the application device on network-level, notifying the network-managing unit about an authenticating result, configuring the network data-infrastructure to provide a connectivity between the network-managing unit and the device-managing unit, performing an authenticating action for the application device for authenticating the access device on application-level, notifying the network-managing unit about the authentication result, and configuring the network data-infrastructure to provide an isolated logical network connectivity between the application device and other equally authenticated application devices.

16 Claims, 8 Drawing Sheets

(56)          References Cited

OTHER PUBLICATIONS

European Patent Office, International Search Report in International
Patent Application No. PCT/EP2022/082787, 3 pp. (Feb. 6, 2023).
European Patent Office, Written Opinion in International Patent
Application No. PCT/EP2022/082787, 5 pp. (Feb. 6, 2023).

* cited by examiner

800

801

802

803

804

805

806

807

808

809

METHOD FOR DEVICE COMMISSIONING IN A NETWORK SYSTEM AND NETWORK SYSTEM

CROSS-REFERENCE TO RELATED APPLICATIONS

The instant application claims priority to European Patent Application No. 21210845.0, filed Nov. 26, 2021, and to International Patent Application No. PCT/EP2022/082787, filed Nov. 22, 2022, each of which is incorporated herein in its entirety by reference.

FIELD OF THE DISCLOSURE

The present disclosure generally relates to a network system, a method for admitting an application device in a network system, a use of a device-managing unit or network-managing unit in a network system, and a computer program element.

BACKGROUND OF THE INVENTION

Toward the use of converged IP-networks and technologies from IT/telecoms domain (5G, TSN, OPC UA, etc.), a variety of authentication mechanisms become required that devices and services have to pass before becoming productive in a system. Toward the use of connected digital services based on (public) cloud and edge infrastructures and with the open system architectures of e.g. OPAF and NOA, connectivity is moving toward converged IP-based networks using OPC UA or REST-based application and management protocols, using wired and (cellular) wireless network infrastructures based on TSN, APL, 5G, NB-IoT, etc.

This use of Internet and telecommunications technologies in automation systems raises the need to apply zero-trust principles to the industrial network, including the mutual authentication of communication partners, fine-granular network segmentation within the network beyond the use and configuration of network barriers for perimeter security like routers and firewalls. The zero-trust guiding principles for system architectures are verify explicitly, use least privileged access, and assume breach. These are applied to these foundational elements: identities, devices, applications, data, infrastructure, and networks, plus users (added as seventh element).

The externalization of network technology (TSN, APL, 5G, NB-IoT, etc.) and operation (e.g. cellular networks hosted by public infrastructure) makes it necessary to integrate the security functions of 5G, TSN, OPC UA, and the automation system in general. Given the different standards, vendors, and operators, it is not possible to consolidate all network authentication and configuration functions in one system like the DCS.

Even the individual mechanisms and processes are typically considered tedious, from creating a common source of trust to managing security credentials in the system and transferring them to devices. The situation that presents itself now includes several such security mechanisms that must be "satisfied" and are still not integrated with each other. For example, no relation is made between a 5G or TSN device being admitted to a network, the secure discovery of an OPC UA device on application layer, and the overall configuration of network resources and security functions.

BRIEF SUMMARY OF THE INVENTION

There may be a desire to improve the admission of an application device in a network system, for example for commissioning the application device in the network. The described embodiments pertain to the network system, the method for admitting an application device in a network system, the use of a device-managing unit device or network-managing unit in the network system, and the computer program element. Synergetic effects may arise from different combinations of the embodiments although they might not be described in detail. Further on, it shall be noted that all embodiments of the present invention concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used. According to a first aspect, a method for admitting an application device in a network system with a network core unit, a network-managing unit, a device-managing unit, and a network data-infrastructure is provided. The method comprises as a first step authenticating, by the network core unit, an application device on network-level. The application device is requesting an access to the network system. In a next step, the network-managing unit is notified about an authenticating result. In a further step, the network data-infrastructure is configured, by the network-managing unit, to provide a connectivity between the network-managing unit and the device-managing unit. In a further step, an authenticating action for the application device is performed, by the device-managing unit, for authenticating the access device on application-level. In a next step, the network-managing unit is notified, by the device-managing unit, about the authentication result. In a further step, the network data-infrastructure is configured, by the network-managing unit, to provide an isolated logical network connectivity between the application device and other equally authenticated application devices.

BRIEF DESCRIPTION OF THE SEVERAL VIEWS OF THE DRAWING(S)

DETAILED DESCRIPTION OF THE INVENTION

Figure 1:
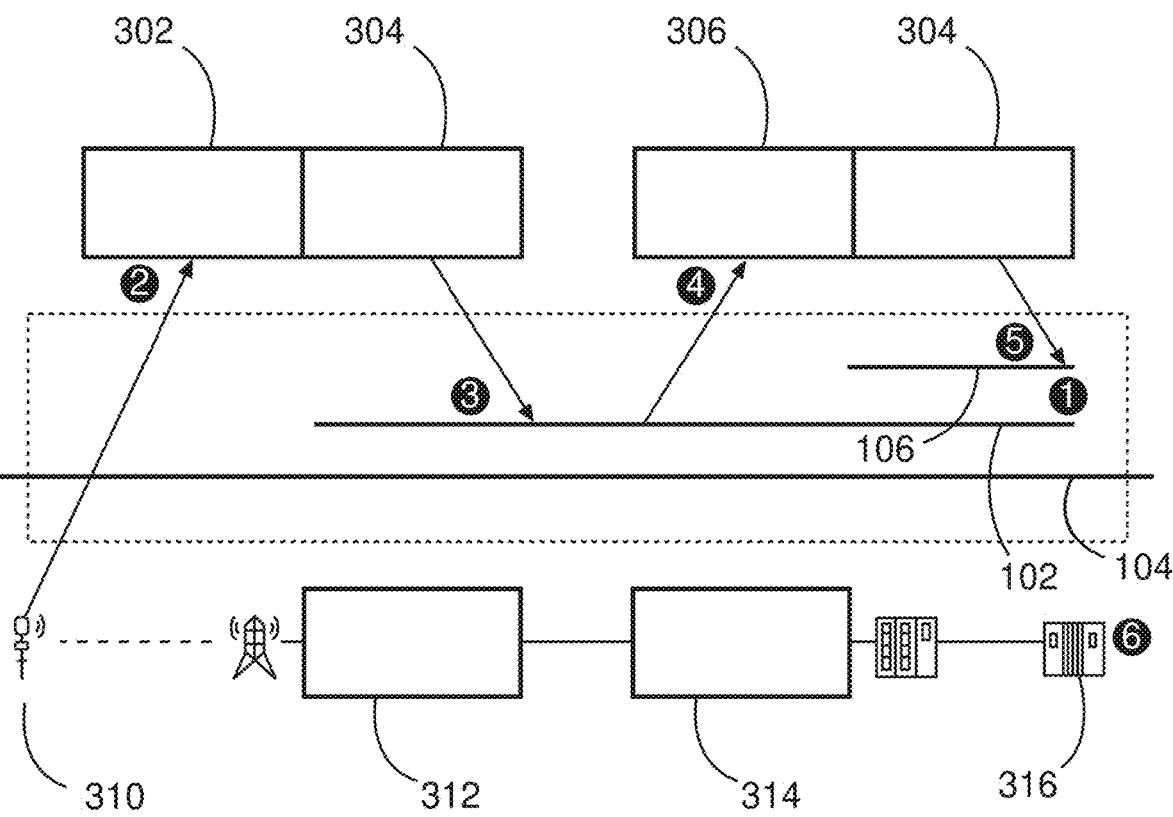
FIG. 1 shows a functional diagram illustrating the commissioning of the access requesting application device in the network system in accordance with the disclosure.

Corresponding parts are provided with the same reference symbols in all figures. FIG. 1 shows a diagram illustrating the commissioning of the access requesting application device 310 in the network system. In the description of the figures, the network-managing unit is also referred to as "network management." In a preparing step, denoted by black circle numbered "1," a network separation is setup. The network system is separated into physical access network 104, a logical commissioning network 102, and an application network 106. In a next step of the commissioning, see black circle numbered "2", the application device is authenticated on network-level by network core unit 302, for example a 5G core, and the network management is notified through the 5G core, in this example with network exposure (5GNI) 302. In a further step of the commissioning, see black circle numbered "2, the network-managing unit (NWM) 304 checks a device directory and moves the device into the commissioning network. In the next step, see black circle numbered "4", an application-level registration with device-managing unit 306, for example, an OPC GDS 306 is performed and the network management is notified. There are for example two options. Option 1: GDS 306 further authenticates the device using predefined credentials. Option 2: network-level authenticity (identity and certificates) is used as source of trust to authenticate and register the device in the GDS 306. In the next step, see black circle numbered "5", the NWM 304 checks connectivity requirements indicating the device, for example, within a TSN CUC or within IO signal lists in a Distributed Control System (DCS), and moves the device to the application network. In the final step, see black circle numbered "6", when the end-to-end connectivity has been established, the protocol-specific startup and the start of the application takes place within the separated network context. After commissioning, the application device 310 can communicate via 5G RAN including packet gateway 312, and (TSN) Ethernet switches 314 with an end device 316 or end station 316.

Figure 2:
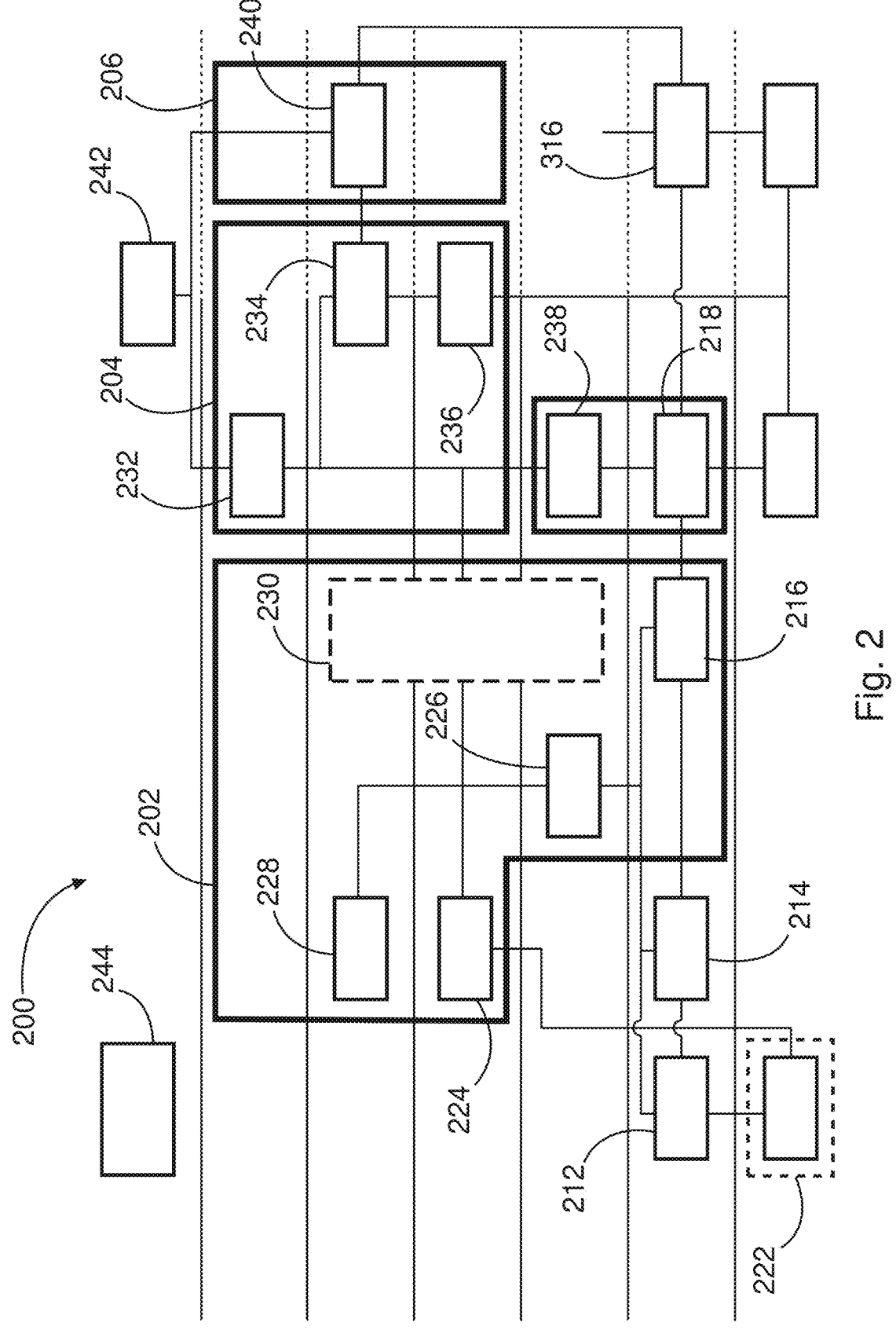
FIG. 2 shows a block diagram of the network system in accordance with the disclosure.

FIG. 2 shows a block diagram of functions, which may be implemented to realize a converged network system 200 as described herein. The network system 200 includes a 3GPP system that provides an application device 310 or mobile device with access to the network system 200. The 3GPP (sub-) system has interfaces on data plane and on system authentication level to the Internet, where the communication is performed using the Ethernet based TSN standard. These standards are defined by IEEE and IETF. The Internet and TSN-system has an interface to the OPC system defined by the OPCF on device and service directories-level and on data plane level. On data plane level, the data sent by an application device (UE) 212, which is for example a 5G device, is received by the RAN 214 and forwarded via a PGW 216 and switches 218 to a TSN end station 316, i.e., an Ethernet device, e.g. an OPC UA client. Application device 212 is further connected to a SIM/eSIM/eUICC 222 that stores authentication data and keys. The precondition for sending data to the TSN end station 316 is an authentication of the application device 212 in the different networks and a gain of access rights. This is provided by the network controller 204. After accessing the 3GPP system via RAN 112, the application device 212 is authenticated by the AMF

224. The AMF 224 utilizes the UDM 228 to retrieve any access based information/restrictions of the subscriber. It also uses the UDM to identify the allowed functionalities of the SMF 226 for the subscriber to make a decision with respect to authentication. The SMF 226 provides functions such as session establishment, modify, release, etc. The NE 230 then exposes the application device 212 to the Network, and the network management 204 is notified about the authenticated application device 212. The network management 204 comprises the CUC 232 and CNC 238 functions, which are functions of a TSN. The CUC 232 configures the streams between the application device 212 and the TSN end station 316, and the CNC 238 configures the switches on data plane. The network management receives certificates from the CA 242 and may use LDAP 234 for data localization or other services. The GDS 240, which also receives certificates from the CA 242 and which has access to the LDAP 234 authenticates the application device 212 on application level, where the application is an OPC application.

Hierarchically, above the data plane is the control plan with SMF and CNC, controlling the RAN 214, the PGW 216 and the switches 218. The next higher level is the system authentication including the AMF 224 and the RADIUS 236. Above this level, there are the device and service directories including the UDM 228, LDAP 234 and GDS 240. This level is also referred to as management plane. The CUC 232 belongs to the Intent and Policies level. The highest level is the corporate level comprising a virtual container environment 244 for the implementation and the certificates. Block 202 indicates the 3GPP units or functions to be implemented, blocks 204, 238 and 218 the IEEE and IETF network-managing unit related units or functions, and block 206 the OPCF related units or functions.

Figure 8:
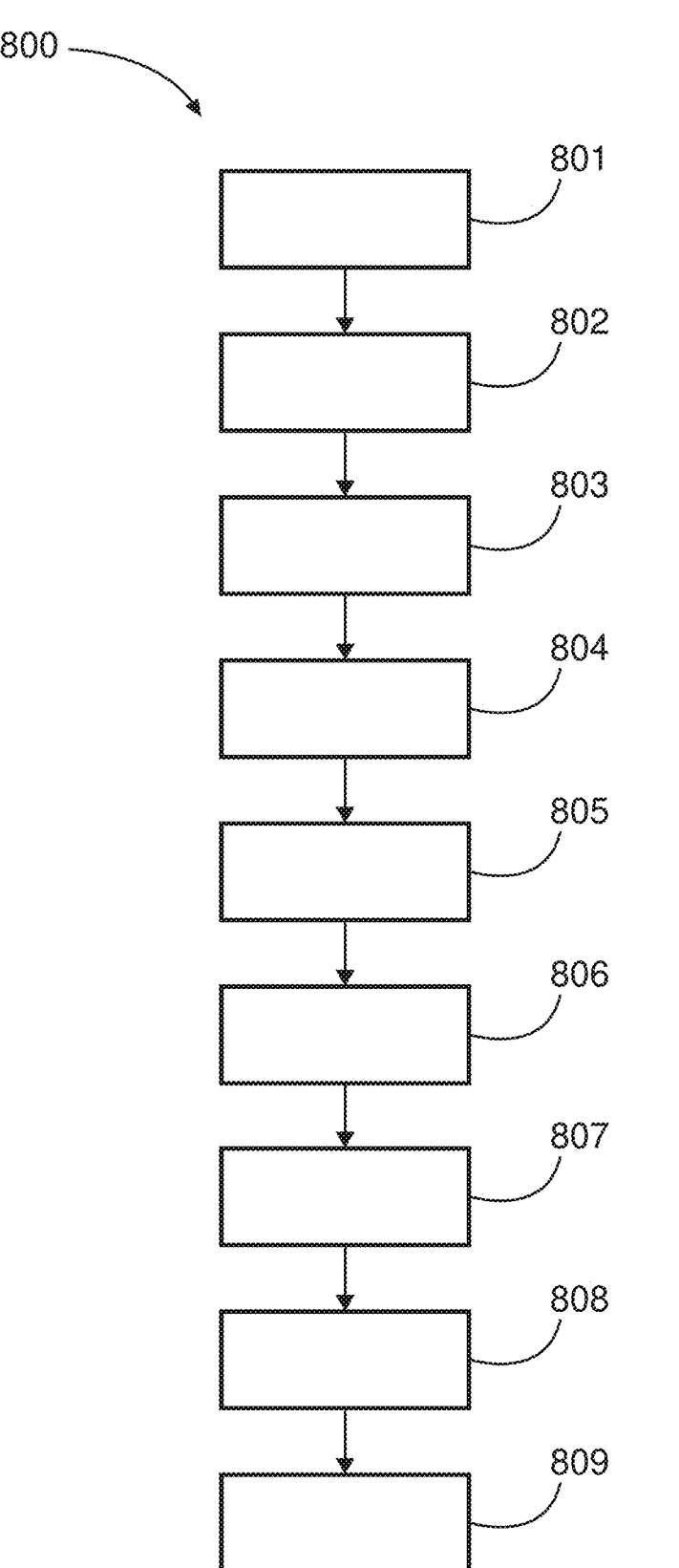
FIG. 8 shows a flow diagram of the method for commissioning an access requesting application device in a network system in accordance with the disclosure.

FIGS. 3 to 7, in combination with FIG. 8, show step by step the access and startup procedure, i.e., the method 800, when an application device, e.g., a 5G application device 310, wants to connect to a TSN Ethernet device 316 and requests an access to an application such as an OPC application, in a converged network system 200. The diagrams in FIGS. 3 to 7 show the involved blocks that represent functional units in the converged network system 200. The single-lined arrows show available connections between the blocks, the white double-lined arrows show the communication paths used in the steps described in FIGS. 3 to 7, and the black double-lined arrows show the communication paths of a single step that is described by means of a particular figure. The bold line between blocks 302 and 312 indicate the 5G backhaul and the bold line between the further blocks indicate the TSN.

In a first step, 801 (blocks and bold lines in FIGS. 3 to 7), the network is separated into a physical access network, a logical application network, and a logical commissioning network. The physical access network comprises the RAN 312, and the logical commissioning network comprises the network management including, in this example, CUC and CNC and the OPC UA GDS. On the logical application network, the application is run after the 5G device has finally verified.

Figure 3:
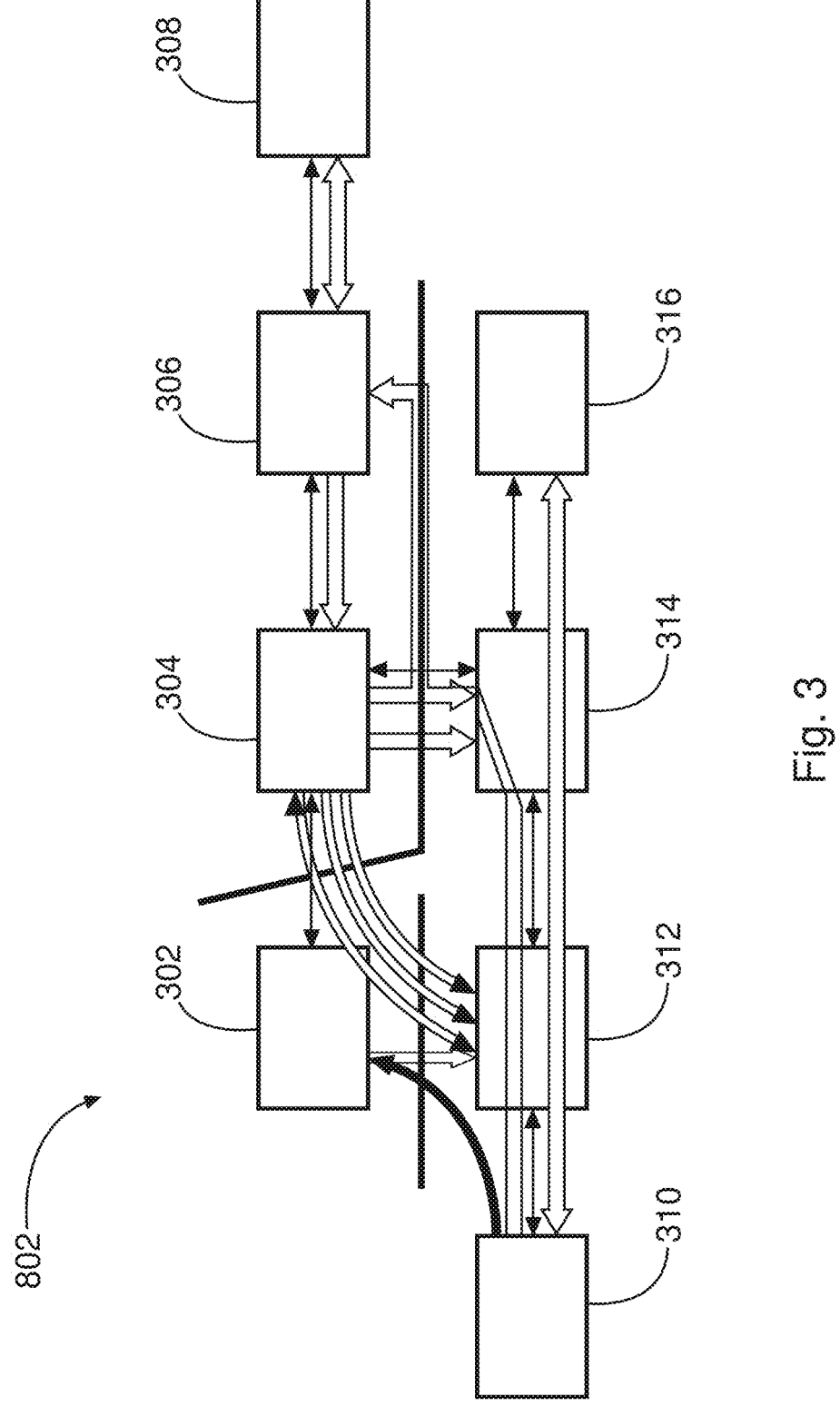
FIG. 3 shows a block diagram of commissioning units during a first step of the commissioning in accordance with the disclosure.

As a second step, 802 in FIGS. 8 and 3, the 5G device accesses the RAN core 302 via a packet gateway 312 in the data plane by requesting a connection setup. The request is forwarded from the RAN to the 5G core including network exposure (NE), where the 5G device is authenticated on 5G network-level. Generally, in the NE, applications can subscribe to certain changes in the network and command the network to exploit its programmable capabilities providing new services for the end-users.

Figures 4A, 4B:
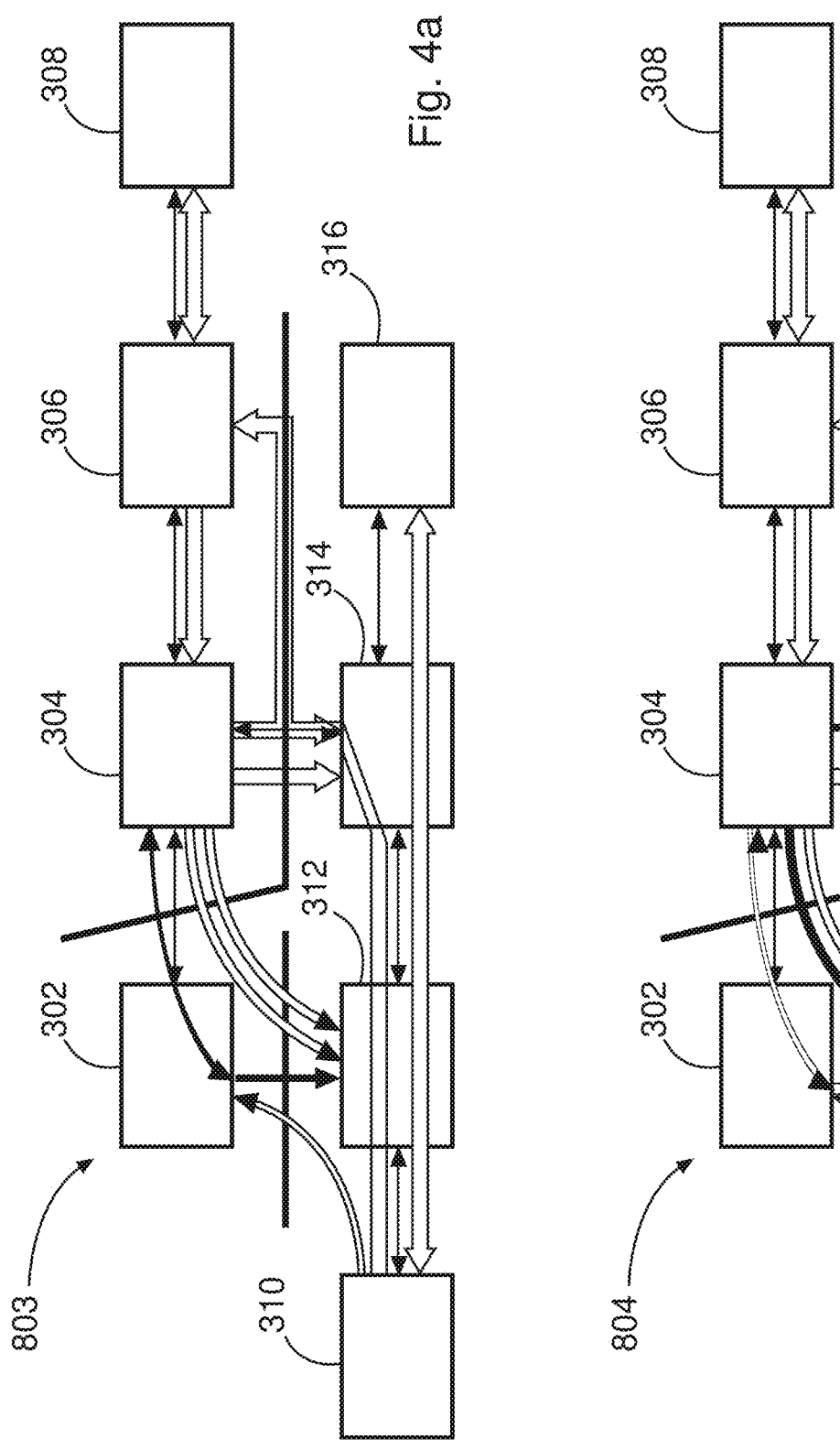
FIGS. 4a and 4b show a block diagram of commissioning units during a second step of the commissioning in accordance with the disclosure.

In step 803, as shown in FIGS. 8 and 4a, the 5G core unit 302 notifies the network-managing unit 304 about the 5G application device 310 requesting an access to an OPC application (FIG. 4a). The notification contains authentication information about the 5G device 310. The network management 304 moves the 5G application device 310 to the commissioning level. The network-managing unit 304 may include, in an example, CUC 232 and CNC 238 that may be part of a TSN. The CUC 232 receives a notification of the stream that shall be transmitted from the 5G device to the TSN Ethernet device 316, i.e. an end device of the data connection, according to an application specific configuration protocol. The CUC communicates with the CNC using a User/Network configuration protocol. In step 804, as shown in FIG. 4b, the network-managing unit configures the TSN Ethernet switches or bridges using a network management protocol, and configures the TSN functions and parameters. Further, the network-managing unit 304 configures the 5G RAN packet gateway 312 such that the data packets are routed to the (TSN) Ethernet switches 314.

Figure 5A:
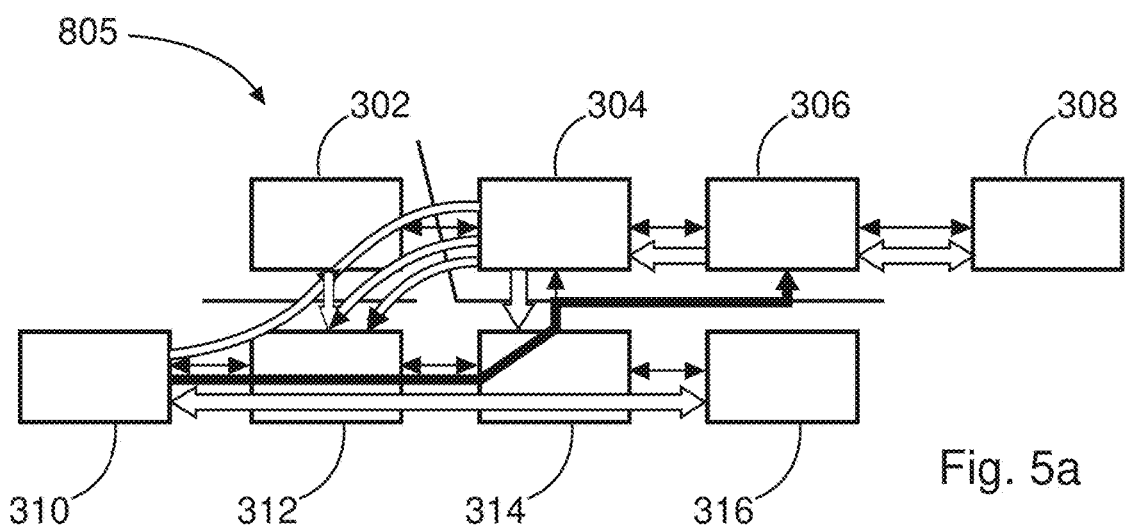
FIGS. 5a, 5b and 5c show a block diagram of commissioning units during a third step of the commissioning in accordance with the disclosure.
Figure 5B:
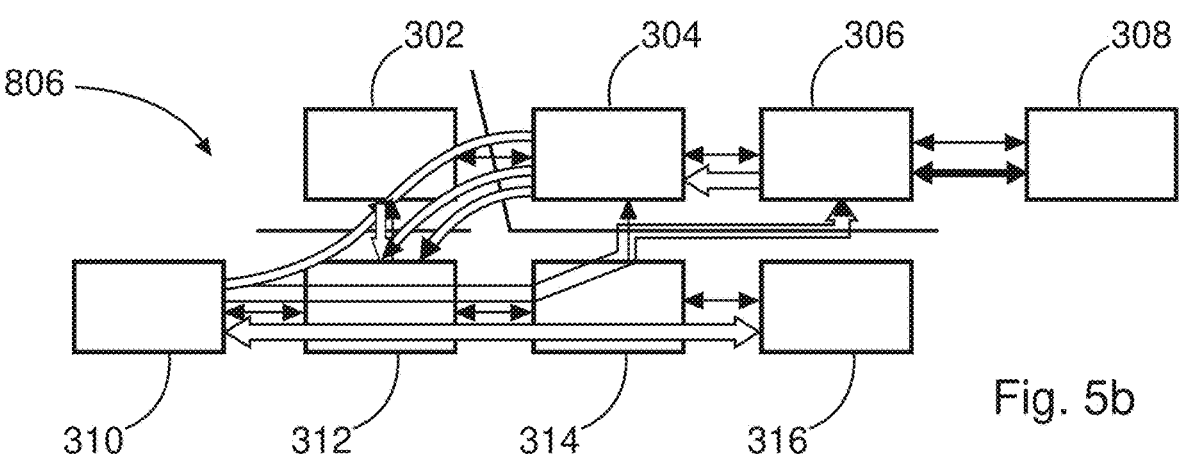
Figure 5C:
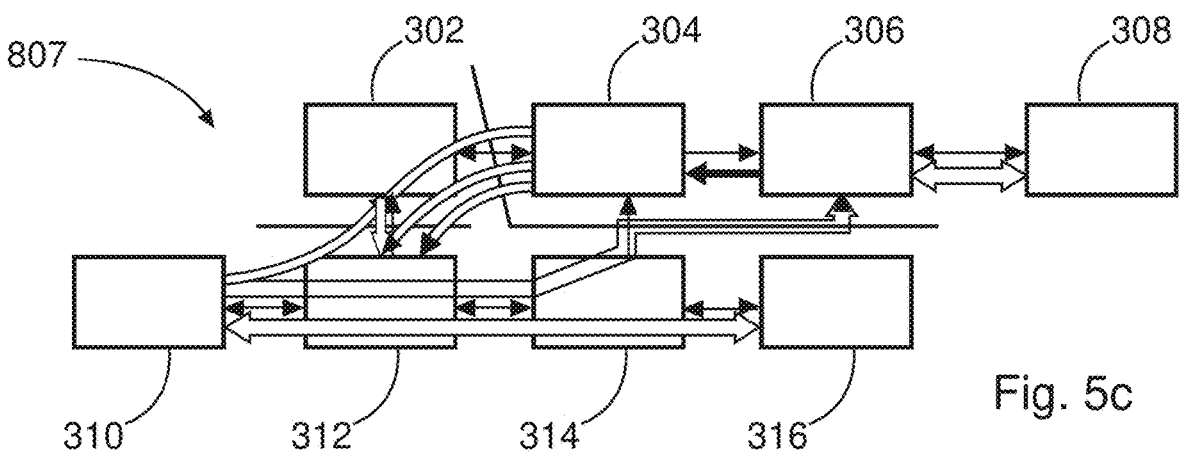

In step 805, as shown in FIGS. 8 and 5a, the 5G RAN packet gateway 312 and the Ethernet switches 314 being already configured, the 5G device 310 is connected via the 5G RAN 312 and the switches 314 over the TSN to the network management 304 and to the OPC UA GDS 306. The GDS 306 performs an authenticating action for the 5G device 310 for authenticating the 5G device on application level. For that, the GDS 306 communicates in step 806 with the LDAP service 308, as shown in FIG. 5b. The LDAP service 308 provides a central place to store usernames and passwords. In step 807, the GDS 306 notifies the network management 304 about the authentication as shown in FIG. 5c.

Figure 6:
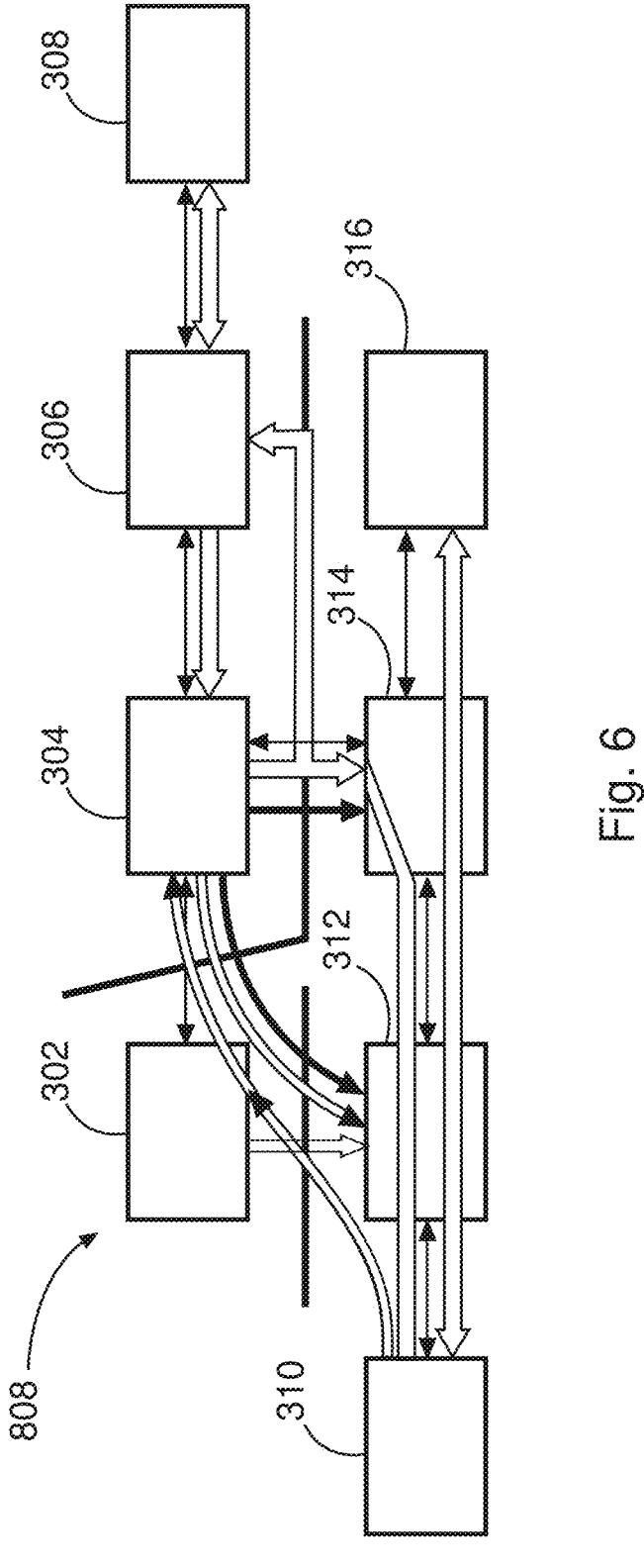
FIG. 6 shows a block diagram of commissioning units during a fourth step of the commissioning in accordance with the disclosure.
Figure 7:
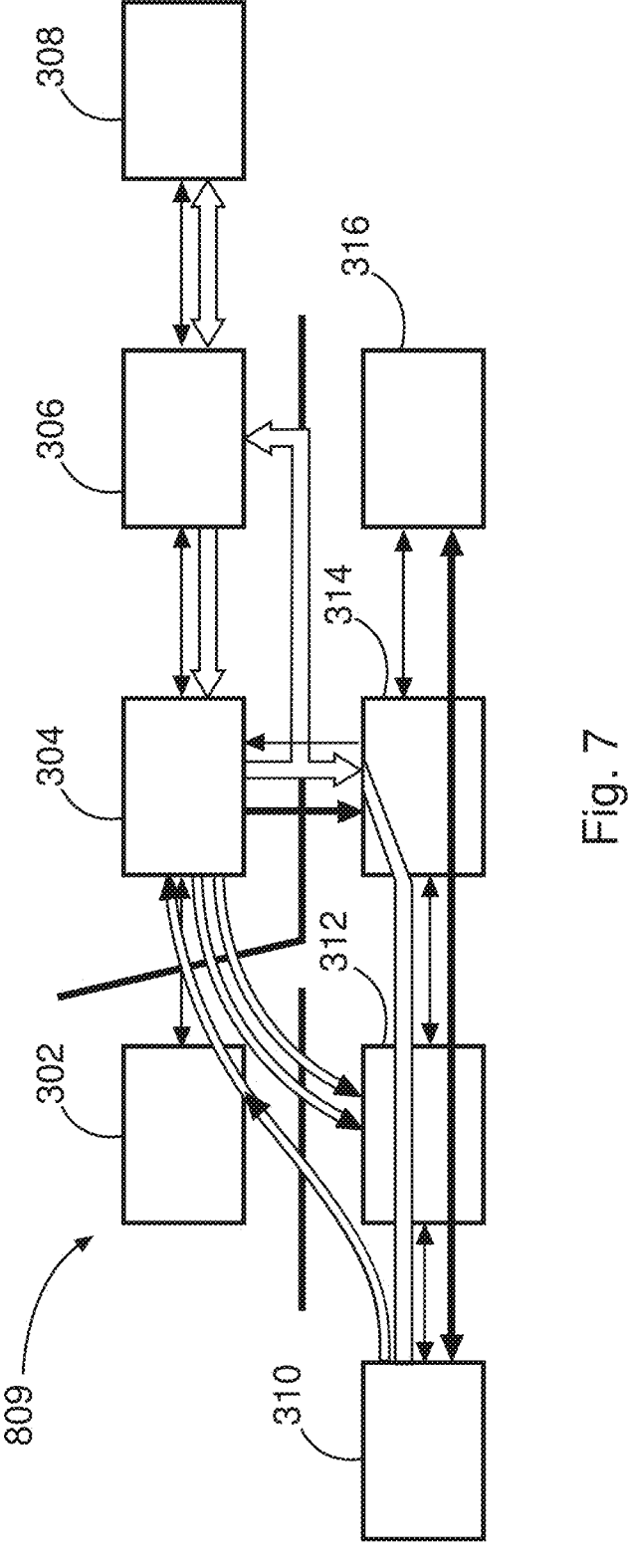
FIG. 7 shows a block diagram of commissioning units during a fifth step of the commissioning in accordance with the disclosure.

In step 808, as shown in FIG. 6, the network management 304 starts the application within the separated application network context, and grants the admission to the application network i.e., the OPC application network in this example, to which it subsequently moves the 5G device from the commissioning network. Further, it configures the gateway 312 and switches 314 such that in step 809 of FIG. 7 the 5G device 310 can access the application and communicate with the (TSN) Ethernet device 316, including mutual OPC UA authentication, and transmit and receive data to/from the (TSN) Ethernet device 316.

All functions may be logical functions realized in hardware and/or software. Each of the functions may be implemented on one or on several hardware devices, or may be distributed over more than one hardware devices. Usually, services are implemented as a server. Further, there may be several instantiations of a function, and one of the several instantiations may be responsible for servicing the 5G device, e.g., process a request, an authentication, etc. Furthermore, some functions rely on several instantiations such as switches, which may locally be distributed over the data network for routing the data packets through the data network, i.e. in the data plane of the network.

The network data-infrastructure may comprise an access network such as a 5G RAN, including a packet gateway, bridges and switches such as TSN Ethernet switches, etc. Hence, the network data-infrastructure is responsible for physically accessing the network and for transporting and routing data to and from an end device. The network core unit may be, for example, a unit of the 5G core with network exposure. Thus, the network core unit may also be part of the data network; however, it is not responsible for forwarding the application data of the application device to the end device. Therefore, the network core unit is not defined as being part of the network data-infrastructure in this disclosure. Operations or devices relating to the network responsible for physically transporting the data to and/or from the application device are denominated as "network-level" operations or devices herein, whereas operations or devices relating to the application, which the application desires to initiate or to join, are denominated as "application-level" operations or devices.

The method provides a two-fold authentication in a merged network. The first one is performed for accessing the data network, e.g. the 5G network, and the second one is performed for "accessing" the application. For that, the core unit provides after successful authentication of the application device the access to entities responsible for the authentication for the application. The network-management unit is a central element, which communicates with the network core unit on one side and the device management device on the other side and which has an interface to the network data-infrastructure for configuring the devices of the network data-infrastructure. The device management device performs the authentication of the application device on application-level. Once the authentication has been successfully finished, the network-management unit configures the network data-infrastructure devices such as gateways and switches so that the application device can communicate over these network data-infrastructure devices with the end device. The end device is, for example, a further application device of the same application. One important point is that the data is only transmitted via and transmitted to devices that have been configured by the network-management unit. That is, only devices that are necessary or part of the application and that have been authenticated already themselves in the network system for the same application are allowed to be involved in the communication. In this way, an isolated logical network is created. The term "logical" expresses the configurability of the network. That is, the network is created by the network-management unit by configuring the devices.

For performing its tasks, the network-managing unit may include a network-level authentication unit and a network resource-managing unit configured for managing network resources such as reserving, configuring, monitoring the network resources. The device-managing unit may perform tasks such as discovering, identifying, authentication, parameterizing/configuring, and monitoring the application devices. In this way, application units that run an application can exchange data and/or information over a transparent application network configured for the application and according to an application protocol.

According to an embodiment, before the step "authenticating, by the network core unit, an application device on network-level", the step configuring the network-managing unit and the device-managing unit as a network for commissioning is performed. Further, the step "configuring, by the network-managing unit, the network data-infrastructure to provide a connectivity between the network-managing unit and the device-managing unit" further comprises admitting or moving the application device to the commissioning network.

In other words, the devices that are responsible for the second authentication and for configuring the network data-infrastructure devices are configured devices themselves to form a commissioning network. That is, also the commissioning network is a separated network created by configuration. The step may be performed by an operator, the network-managing device, or a controller in the network. The step may be performed at a later stage, e.g., after the step notifying, by the network core unit, the network-managing unit about an authenticating result. The commissioning network may comprise further devices such as a device directory, data storage devices comprising information about the application device, further devices, or the application in general. The step admitting the application device to the commissioning network implicates that the second authentication, i.e., application-level authentication is not performed when the first authentication, i.e. network-level authentication has failed. In this case, also the setup of the commissioning network is not required, if the commissioning network is setup after the notifying step.

Because it is configurable, the commissioning network may be a temporary or a resident network. However, it may be in any case available as long as the application is running, to ensure that application devices for this application can still be authenticated and integrated in the network.

According to a second aspect, a network system is provided. The network system comprises a network data-infrastructure, a network core unit connected to the network data-infrastructure, a network-managing unit connected to the network core unit and the network data-infrastructure, and a device-managing unit connected to the network-managing unit. The network core unit is configured for authenticating an application device on network-level and for notifying the network-managing unit about an authenticating result. The network-managing unit is configured for configuring the network data-infrastructure to provide a connectivity between the network-managing unit and the device-managing unit, and admitting an application device to the network system. The device-managing unit is configured for performing an authenticating action for the application device for authenticating the access device on application-level, and notifying the network-managing unit about the authentication result. The network-managing unit is further configured for configuring the network data-infrastructure to provide an isolated logical network connectivity between the application device and other equally authenticated application devices.

The network data-infrastructure may comprise an access network such as a radio access network, packet gateways, switches and the like. The access network may comprise means to connect with an application device and an end device, which may also be for example an application device. The network data-infrastructure has means to forward data between the application device and the end device. The term "is connected" relates to the structure of the system and can also be expressed as "has an interface to". The structural connections may be functionally configurable, e.g., to form an isolated network connectivity between the network-level-authentication unit and the device-managing unit, and admitting an application device to the network system, or, for example, the network-managing unit may include a network-level authentication unit and a network resource-managing unit configured for managing network resources. The network resource-managing unit may, for example configure a switch as one of the resources to be part of the sub-network for connecting the application devices with the end device via the switch. The network-level authentication unit may be configured for receiving and managing the authentication performed by the network core unit on network-level. In addition, the functions, such as represented by the device-managing unit, could be initiated or instantiated only after an event, such as a successful network authorization at the network level, has occurred.

The network system may further comprise one or more application units configured for being operated as an application for exchanging defined data and/or information over a transparent application network configured for the application and according to an application protocol.

The access requesting application device, "the application device" for short herein, may be, for example a user equipment in general, and in particular a sensor, an actuator, a monitoring device, a control device, an OPC client or server, a virtual application container (e.g. Docker or Kubernetes) eventually deployed on a physical execution host, or another device capable to communicate according to a physical network standard. Such a standard may be an IP standard and based, for example, on a 5G standard or related standards such as TSN, APL, NB-IoT, etc. "Network-level" or "physical network-level" therefore also refers to functions and devices of the physical network such as the 5G radio access network or Ethernet copper/fiber, providing the physical access to the network system and the data transport infrastructure. The physical network is the underlying network of, for example, the (logical) commissioning and the application network. Therefore, the network-level may be considered to be below the application layer.

In this disclosure, the term "network context" is used. A network context may include network addresses, packets, fingerprints, or other types of data suited to direct data forwarding in the network. A "unit" as used herein may be a physical and/or a logical device and represents a function or service, i.e., a unit may be based on hardware and/or software and may be implemented on a single hardware device or on a plurality of hardware devices. In other words, the network system provides a structure and functions that enable dual authentication of an application device that desires access to the network system. First, on network-level, and second, before starting the application such as an OPC application, on application-level. The device-managing unit may use the verified identity of the application device after the, e.g. 5G, authentication or IEEE 802.1X for Ethernet of the physically connected device. When the first authentication was successful, the network resource-managing unit configures the network such that the device-managing unit is connected to the network resource-managing unit in an isolated way. Hereby, "Network resource-managing unit" is seen as a logical unit, which may host several services such as IEEE 802.1Q TSN CUC and CNC, and which may be implemented on one or several physical devices. The second authentication uses the device-managing unit.

The device-managing unit is part of the application. Since the application involves several units and hardware devices such as servers and clients, the application may be seen as forming or being based on an application-network. For example, OPC UA is such a network. The second authentication is performed capsuled from network-level and application-level by the device-managing unit. That is, the device-managing unit authentication service is completely separated from the network-level authentication functions and from an access by the application. Device-managing unit services are initiated after the network-level authentication has been finished and the device-managing unit has been notified by the authentication function of the network. Using the result and information gained from the network, for the further authentication, no further authentication interaction with the network is required. When the network resource-managing unit has successfully gained all required authentications and verifications, the application can effectively be run, provided the end devices are running and are configured. Since the network resource-managing unit may accommodate, for example, CUC and CNC, the application device and a connection end device may be configured by the CUC, and physical network devices for the data transport or streams such as gateways between the physical access network and a TSN and switches of the TSN are configured. The distributed application is communicating within the separated application network context, that is, only in the required and separated context comprising only those peer devices, to which the application device, rather, one specific application service instance on the device, needs to connect to, i.e. only to all application partners.

According to an embodiment, the network managing unit comprises a network resource-managing unit configured to setup a commissioning network comprising the network-managing unit and the device-managing unit as a separated sub-network and to move the application device to the commissioning network if a verified network-level identity of the application device is available. The device-managing unit is further configured to perform the authenticating action within the commissioning network. The network resource-managing unit is further configured to move the application device from the commissioning network to an application network in a step after the performing the authenticating action by the device-managing unit. "Moving" in this context means, that data traffic from and/or to the device takes place only within the respective network. For example, data traffic from the application-requesting authentication or the automation application is forwarded only within the logical application network to other network members. The application network is the network connecting the devices of an application on application-level, that is, communicating with each other using an application protocol after the application is started.

It is understood that the identities of all communication partners may explicitly be verified on network and application layer before configuring any level of network admission. That is, the entities or units described herein may be used for authenticating more than one application devices, or several instances of a unit may be present in the network system.

According to an embodiment, the commissioning network is configurable to be a temporary network or a resident network. This means, the authentication performed by the device-managing unit and the network authentication is performed in a separate network context, which exists only for the time of the second authentication. It therefore supports the separation from the underlying network and the application network. The device-managing unit device may therefore further be configured to tear down the temporary commissioning network after the commissioning is completed. In this context, "setup" and "tear down" may be a "configuration" performed by the network resource-managing unit. The tearing down may relate to the commissioning network, however single instances, as for example, the device-managing unit may be kept alive.

According to an embodiment, the network-managing unit is configured further for checking connectivity requirements before moving the access requesting application device to the application network and configuring the data forwarding to fulfill these requirements, for example, beyond basic reachability of the members of the same network. The NWM checks the connectivity requirements indicating the device, e.g. within a Time Sensitive Network Centralized User Configuration (TSN CUC) or within IO signal lists in a Distributed Control System (DCS). Such connectivity requirements are for example high availability, high throughput, real-time transmission, low latency and low jitter. The CUC collects the requirements of the application and forwards them in collections per stream to the centralized network configuration (CNC). After configuration by the CNC, the CUC forwards the final configurations to the end-devices, including the application device.

According to an embodiment, the authenticating action includes using predefined credentials. Using predefined credentials is one option for authenticating the access requesting application device. In this case, a complete set of identities is exchanged, e.g. between the application device and the device-managing unit, which may access the LDAP to retrieve and check the predefined credentials, and the trust gained via these individual identities is stacked/chained in the authentication processes.

According to an embodiment, the authenticating action is based on a single secure identity used also in network-level authentication of the access requesting application device in the device-managing unit. Using a network-level authenticity as source of trust is another option for authenticating the access requesting application device. In this case, only one common strong device identity (based on IEEE 802.1AR) is necessary from which the identities and credentials of devices, systems and services reaching from the network layer to the application layer, and from wired to wireless protocols are derived. This allows bootstrapping application-level authentication by using network-level credentials and authenticity, i.e., identity and certificates, only having to exchange low-level networking identities during device ordering.

According to an embodiment, the commissioning network and the application network are logical networks, wherein at least the commissioning network is a VLAN or a stream forwarding domain identified by any combination of Ethernet, IP header and service information. The application network and the commissioning layer may be logical networks. "Logical" means that the instances, services and functions are defined by software and/or hardware that may be configured or re-configured to form an individual network or a sub-network. The hardware used may be shared with other instances, services or functions, which may also belong to other parts of the network. Vice versa, the instances, services or functions may be distributed over several hardware devices. The logical commissioning network may be implemented as VLAN to reach a capsuling and to be not accessible directly by devices or applications except of the interfaces described herein. Similarly, the application device may get access to a VLAN that represents the application network.

According to an embodiment, the physical network is one or several of IEEE 802.3 Ethernet, IEEE 802.3cg APL, 3GPP rel15 (and beyond) 5G, 3GPP NB-IoT, Bluetooth Low Energy (BLE). According to an embodiment, the application is based on OPC UA client/server sessions or publish/subscribe or Representational State Transfer (REST)-based application and management protocols. For example, the entire device management system can be a combination of an FDI compliant client server infrastructure with an OPC UA GDS extended with an OPC UA alias server.

According to an embodiment, the device-managing unit is configured to use additionally location data for authentication. Location-based authentication may be performed, for example, as an addition step in the authentication procedure. Alternatively, location data may be part of e.g., the credentials or they may be compared with an allowed region, a black list or a white list. Location data such as automation tags associated with the application device may further be used for configuring the network data-infrastructure. The application device therefore is usable for radio-based localization.

According to an embodiment, the location is one of a geospatial location, a radio direction, a wired connection point, GPS coordinates, a radio beam direction, a distance, or a switch port or an IO port.

According to a further aspect, a computer program element is provided, which when being executed by one or more processors in the network system as described herein, instructs the network core unit, the network-managing unit, the device-managing unit, and the network-managing unit to perform the steps of the method as described herein.

The computer program element may be part of a computer program, but it can also be an entire program by itself. For example, the computer program element may be used to update an already existing computer program to get to the present invention. The program element may be stored on a computer readable medium. The computer readable medium may be seen as a storage medium, such as for example, a USB stick, a CD, a DVD, a data storage device, a hard disk, or any other medium on which a program element as described above can be stored.

The embodiment in accordance with the disclosure realizes a zero-trust network admission for connected devices and services. Application-layer authentication is used to authorize network-layer admission. Security aspects of different connectivity technologies like 5G, APL, TSN, OPC UA sessions and pub/sub are integrated. With respect to conventional system, the effort is reduced and the confidence for authentication in private networks is improved. Resource efficiency to reserve resources only exactly as needed is enabled. The invention allows further for enabling micro segmentation and perfect application isolation with minimum needed access.

Initially, only the 5G network-level authentication device is accessible by the access requesting application device. After 5G network-level authentication, only the device-managing unit is accessible by the access requesting application device. After application-level authentication, only connection points on physical network-level and application-level that are required for a use-case for which the access requesting application device is requesting the access are accessible by the access requesting application device.

An admission to an application conventionally requires access rights to all parts of the network. Here, instead of granting access to the complete network, only access to those parts is granted that are involved by running the application, which may also include transit networks if they are not tunneled. Moreover, only access to the devices and services according to the determined connectivity is granted. This policy is compliant to a network-wide zero-Trust policy. Trust in devices/systems is gradually specialized and hosted services toward the access rights needed for legitimate application use-cases. With respect to conventional networks, this is different from simply raising the trust level for a device or service toward full network access. Therefore, a zero-trust admission approach is implemented, using a trust stacking/chaining of the mutual authentication on physical network—(e.g. 5G-AKA/EAP-TLS) and application-layer (e.g. OPC UA via GDS) and a stepwise authorization of network access (e.g. commissioning VLAN, control-loop TSN stream) based on the previous authentication step of the physical network layer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In this disclosure, the following abbreviations are used:

AKA Authentication and Key Agreement

AMF Authentication Management files (UMTS)

AMF/SEAF Core Access and Mobility Management Function

APL Ethernet Advanced Physical Layer (Ethernet-APL)

BLE Bluetooth Low Energy

CA Certificate Authorities

CNC Centralized Network Controller

CUC Centralized User Configuration

DCS Distributed Control System

DSA Directory System Agent

EAP-TLS Extensible Authentication Protocol-Transport Layer Security

FDI Field Device Integration

GDS Global Discovery Server

IP Internet Protocol

LDAP Lightweight Directory Access Protocol

NB-IoT Narrowband Internet of Things (NB-IoT)

NE Network exposure

NOA NAMUR Open Architecture

OPAF Open Process Automation Forum

OPC Open Platform Communications
OPC UA OPC Unified Architecture
OPCF OPC Foundation
PGW-U PDN Gateway User Plane function
PLC Programmable logic controller
RAN Radio Access Network
REST Representational State Transfer
SDM Subscriber Data Management
SEAF Security Anchor Function
SMF Session Management Function. Session establish-
    ment, modify, release
TSN Time Sensitive Network
UDM Unified Data Management
UE User Equipment
VLAN Virtual Local Area Network
The following reference numerals are used in the present
disclosure:
102 logical commissioning network
104 physical access to RAN
106 logical application network(s)
200 network system
202 3GPP units or functions for implementation
204 IEEE and IETF network-managing unit related units
    or functions for implementation
206 OPCF related units or functions for implementation
212 application device/UE
214 RAN
216 PGW/TT
218 Switch 222 SIM/eSIM/eUICC
224 AMF/SEAF
226 SMF
228 UDM
230 NE
232 CUC
234 LDAP
236 RADIUS
238 CNC
240 GDS
242 CA
244 virtual container environment
302 5G core with network exposure
304 network-management unit; Network Management
306 device-managing unit; OPC UA GDS
308 LDAP
310 application device: 5G Device
312 RAN; gateway; 5G RAN with packet gateway
314 switch; (TSN) Ethernet Switch
316 (TSN) Ethernet Device; end device/station
800 Method
801-809 Method steps

What is claimed is:

1. A method for admitting an application device in a
network system with a network core unit, a network-man-
aging unit, a device-managing unit, and a network data-
infrastructure, the method comprising:
    authenticating the application device on network-level by
        the network core unit;
    notifying the network-managing unit about an authenti-
        cating result by the network core unit;
    configuring the network data-infrastructure by the net-
        work-managing unit to provide a connectivity between
        the network-managing unit and the device-managing
        unit;
    performing an authenticating action for the application
        device by the device-managing unit for authenticating
        the access device on application-level;

notifying the network-managing unit by the device-man-
        aging unit about the authentication result; and
    configuring the network data-infrastructure by the net-
        work-managing unit to provide an isolated logical
        network connectivity between the application device
        and other equally authenticated application devices.

2. The method according to claim 1, the method further
comprising, before authenticating by the network core unit
an application device on network-level, configuring the
network-managing unit and the device-managing unit as a
network for commissioning.

3. The method according to claim 2, wherein configuring
by the network-managing unit the network data-infrastruc-
ture to provide a connectivity between the network-manag-
ing unit and the device-managing unit further comprises
admitting the application device to the commissioning net-
work.

4. A network system comprising:
    a network data-infrastructure;
    a network core unit connected to the network data-
        infrastructure and configured for authenticating an
        application device on network-level and for notifying
        the network-managing unit about an authenticating
        result;
    a network-managing unit connected to the network core
        unit and the network data-infrastructure and configured
        for configuring the network data-infrastructure to pro-
        vide a connectivity between the network-managing unit
        and the device-managing unit, and admitting an appli-
        cation device to the network system;
    a device-managing unit connected to the network-man-
        aging unit and configured for performing an authenti-
        cating action for the application device for authenticat-
        ing the access device on application-level; and
        notifying the network-managing unit about the authen-
        tication result;
    wherein the network-managing unit is further configured
        for configuring the network data-infrastructure to pro-
        vide an isolated logical network connectivity between
        the application device and other equally authenticated
        application devices.

5. The network system according to claim 4, wherein the
network managing unit comprises a network resource-man-
aging unit configured to setup a commissioning network
comprising the network-managing unit and the device-
managing unit as a separated sub-network and to move the
application device to the commissioning network when a
verified network-level identity of the application device is
available.

6. The network system according to claim 5, wherein the
device-managing unit is further configured to perform the
authenticating action within the commissioning network.

7. The network system according to claim 6, wherein the
network resource-managing unit is further configured to
move the application device from the commissioning net-
work to an application network in a step after the performing
the authenticating action by the device-managing unit.

8. The network system according to claim 5, wherein the
commissioning network is configurable to be a temporary
network or a resident network.

9. The network system according to claim 5, wherein the
network-managing unit is further configured for checking
connectivity requirements before moving the access request-
ing application device to the application network and con-
figuring the data forwarding to fulfill these requirements.

10. The network system according to claim 4, wherein the
authenticating action includes using predefined credentials.

11. The network system according to claim 4, wherein the authenticating action is based on a single secure identity used also in network-level authentication of the application device in the device-managing unit.

12. The network system according to claim 4, wherein the commissioning network and the application network are logical networks, wherein at least the commissioning network and/or the application network is a VLAN or a stream forwarding domain identified by any combination Ethernet and IP header and service information.

13. The network system according to claim 4, wherein the physical network is one or several of IEEE 802.3 Ethernet, IEEE 802.3cg APL, 3GPP rel15, 5G, 3GPP NB-IoT, Bluetooth Low Energy, BLE.

14. The network system according to claim 4, wherein the application is based on OPC UA client/server sessions or publish/subscribe or Representational State Transfer, REST-based application and management protocols.

15. The network system according to claim 4, wherein the device-managing unit is configured to use additionally location based data for authentication.

16. The network system according to claim 4, wherein the location is one of the following: a geospatial location, a radio direction, a wired connection point, a switch port, GPS coordinates, a radio beam direction, a distance, an IO port.

* * * * *